(12) United States Patent
Schweitzer et al.

(10) Patent No.: US 7,152,399 B2
(45) Date of Patent: Dec. 26, 2006

(54) HIGH EFFICIENCY TORQUE CONVERTER

(75) Inventors: Jean M. Schweitzer, Ypsilanti, MI (US); Victor M. Roses, Ann Arbor, MI (US); Donald G. Maddock, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/111,042

(22) Filed: Apr. 21, 2005

(65) Prior Publication Data
US 2005/0268603 A1    Dec. 8, 2005

Related U.S. Application Data

(60) Provisional application No. 60/576,853, filed on Jun. 3, 2004.

(51) Int. Cl.
*F16D 33/00*    (2006.01)
(52) U.S. Cl. .......................... 60/361; 416/180
(58) Field of Classification Search ................ 60/341, 60/361, 365, 366, 367
See application file for complete search history.

(56) References Cited

U.S. PATENT DOCUMENTS

| | | | | |
|---|---|---|---|---|
| 3,320,747 A | * | 5/1967 | Denes | 60/361 |
| 3,330,111 A | * | 7/1967 | Denes | 60/361 |
| 4,177,885 A | | 12/1979 | Ross | 192/3.3 |
| 5,005,356 A | * | 4/1991 | Saunders | 60/330 |
| 5,431,536 A | | 7/1995 | By et al. | 415/200 |
| 6,746,369 B1 | * | 6/2004 | Tsunekawa et al. | 477/176 |

* cited by examiner

*Primary Examiner*—Hoang Nguyen
(74) *Attorney, Agent, or Firm*—Christopher DeVries

(57) ABSTRACT

A torque converter assembly is provided, which includes an impeller, a turbine, and a stator. The impeller and the turbine each have a plurality of passages for directing fluid. The inlet and outlet of each passage are larger in cross-sectional area than the middle portion of the passage, located between the inlet and outlet. This structure reduces energy losses, which typically occur near the midpoint of the passage due to flow separation. Additionally, reducing the flow area of the torus of the impeller and turbine permits an overall thinner torque converter, which is preferred for engine packaging purposes. The stator includes a core, a shell, and a plurality of stator blades. One end of each stator blade is fixed to the core, while the opposite end is fixed to the shell. Each stator blade has a mean camber line and an associated mean camber line length. The maximum thickness of each stator blade is approximately 20% of the mean camber line length. Each stator blade has a midsection located between the ends affixed to the core and the shell. The midsection of each stator blade has a larger cross-sectional area than either end of the blade. This stator blade structure creates a larger stator blade surface, which is more effective at re-directing fluid within the torque converter.

25 Claims, 6 Drawing Sheets

HIGH EFFICIENCY TORQUE CONVERTER

CROSS-REFERENCE TO RELATED APPLICATION

This application claims the benefit of U.S. Provisional Application No. 60/576,853 filed Jun. 3, 2004, which is hereby incorporated by reference in its entirety.

TECHNICAL FIELD

This invention relates to torque converter assemblies having an impeller, a turbine, and a stator.

BACKGROUND OF THE INVENTION

Current automatic power transmissions generally include a hydrodynamic input device such as a torque converter or fluid coupler. A torque converter is employed mainly to provide torque multiplication in the lower speed range. A torque converter consists of an engine-driven impeller, a fluid turbine, and a fluid stator. The engine-driven impeller accelerates fluid for passage to the turbine. The turbine converts the fluid energy coming from the impeller into mechanical energy, which is transmitted to the input shaft of a transmission.

The stator mechanism disposed between the fluid inlet of the impeller and the fluid outlet of the turbine redirects the fluid from the turbine to the impeller thereby improving the flow efficiency and increasing the torque multiplication of the hydrodynamic torque converter. The fluid passes from the inner section of the impeller torus substantially radially outward in a toric path and then through the path in the turbine in a substantially toric path back to the stator. In constant area turbine assemblies, the flow therein can encounter energy losses when a reversal or separation in flow occurs near the center of the torus flow path adjacent the inner side wall. This flow inconsistency reduces the efficiency of the torque converter.

A stator is made up of a plurality of stator blades, which are connected at one end to a relatively small ring, the shell, and at the other end to a larger ring, the core. Fluid flowing through the stator passes along the stator blades. These blades force the fluid to change direction so fluid exiting the stator enters the pump flowing in the same direction as the pump is rotating, thereby conserving power. Stator blades with a larger surface area are more effective at re-directing the fluid. The core has conventionally limited the surface area of the stator blades because the sides of a standard stator blade are linearly configured between the core and the shell. This design often results in a stator blade with a relatively small surface area, and therefore a loss of potential torque.

The stator blade cross-sectional design is important in the overall design of a torque converter. Stator blade shapes that result in flatter input speed lines allow for engine operation at lower engine speeds, which improves vehicle fuel economy. Additionally, flatter input speed lines improve performance in some vehicle applications due to smaller changes in engine speed when the torque converter clutch is applied.

An example of a conventional torque converter assembly is described in U.S. Pat. No. 4,177,885 and an example of a conventional torque converter stator is described in U.S. Pat. No. 5,431,536, both of which are assigned to General Motors Corporation and are hereby incorporated by reference.

SUMMARY OF THE INVENTION

It is an object of the present invention to provide an improved torque converter having an impeller, a turbine, and a stator.

A torque converter assembly is provided, which includes an impeller, a turbine, and a stator. The impeller and the turbine each have a passage for directing fluid. Each passage has an inlet having an inlet cross-sectional area, an outlet having an outlet cross-sectional area, and a middle portion having a middle portion cross-sectional area. The middle portion cross-sectional area is smaller than each of the inlet cross-sectional area and the outlet cross-sectional area. The stator includes a core, a shell, and a plurality of stator blades. Each stator blade has a mean camber line, a mean camber line length, and a maximum thickness, which is less than approximately 20% of the mean camber line length. Each stator blade has a midsection defined by a mid-cross-sectional area, a first end defined by a first end cross-sectional area attached to the stator core, and a second end defined by a second end cross-sectional area attached to the stator shell. The mid-cross-sectional area is larger than each of the first cross-sectional area and the second cross-sectional area.

In a second embodiment of the present invention, a torque converter assembly having an impeller, turbine, and stator is provided. The impeller has a predetermined flow path for directing fluid radially outward through a substantially toroidal path. The turbine has a substantially toroidal flow path for directing fluid from the impeller radially inward. The toroidal flow path through the turbine has an inlet and an outlet. The flow path in the turbine decreases in flow area from the inlet to a predetermined point having a third area along the flow path and increases in flow area from the predetermined point to the outlet. The stator has a plurality of stator blades. Each stator blade has a mean camber line length and a maximum thickness, which is less than approximately 20% of the mean camber line length. Additionally, each stator blade has a first end defined by a first end cross-sectional area, a second end defined by a second end cross-sectional area, and a midsection defined by a mid-cross-sectional area. Each stator blade becomes smaller in cross-sectional area in a direction from the midsection to the first end and becomes smaller in cross-sectional area in a direction from the midsection to the second end. Thus, the mid-cross-sectional area is larger than each of the first and second end cross-sectional areas.

In a third embodiment of the present invention, a torque converter assembly is provided including an impeller, a turbine, and a stator. The impeller and the turbine each have a passage for directing fluid. Each passage has an inlet having an inlet cross-sectional area, an outlet having an outlet cross-sectional area, and a middle portion having a middle portion cross-sectional area. The middle portion cross-sectional area is smaller than each of the inlet cross-sectional area and the outlet cross-sectional area. The stator includes a core, a shell, and a plurality of stator blades. Each stator blade has a mean camber line, a mean camber line length, and a maximum thickness that is less than approximately 20% of the mean camber line length.

In a fourth embodiment of the present invention, a torque converter assembly including an impeller, a turbine, and a stator is provided. The impeller and the turbine each have a passage for directing fluid. Each passage has an inlet having an inlet cross-sectional area, an outlet having an outlet cross-sectional area, and a middle portion having a middle portion cross-sectional area. The middle portion cross-sectional area is smaller than each of the inlet cross-sectional area and the outlet cross-sectional area. The stator includes a core, a shell, and a plurality of stator blades. Each stator blade has a midsection having a mid-cross-sectional area, a first end having a first end cross-sectional area attached to the core, and a second end having a second end cross-sectional area attached to the shell. The mid-cross-sectional area is larger than each of the first end cross-sectional area and the second end cross-sectional area.

In a fifth embodiment of the present invention, a torque converter assembly is provided including an impeller, a turbine, and a stator. The stator includes a core, a shell, and a plurality of stator blades. Each stator blade has a mean camber line, a mean camber line length, and a maximum thickness, which is less than approximately 20% of the mean camber line length. Each of the stator blades has a midsection having a mid-cross-sectional area, a first end having a first end cross-sectional area attached to the core, and a second end having a second end cross-sectional area attached to the shell. The mid-cross-sectional area is larger then each of the first end cross-sectional area and the second end cross-sectional area.

In a sixth embodiment of the present invention, a torque converter assembly including an impeller, turbine, and stator is provided. The turbine has a predetermined flow path for directing fluid radially inward through a substantially toroidal path. The impeller has a substantially toroidal flow path for directing fluid radially outward. The flow path in the impeller has an inlet and an outlet. The flow path decreases in flow area from the inlet to a predetermined point having a third area along the flow path and increases in flow area from the predetermined point to the outlet. The stator includes a plurality of stator blades. Each stator blade has a mean camber line length and a maximum thickness, which is less than approximately 20% of the mean camber line length. Each stator blade has a first end defined by a first end cross-sectional area, a second end defined by a second end cross-sectional area, and a midsection defined by a mid-cross-sectional area. Each stator blade becomes smaller in cross-sectional area in a direction from the midsection to the first end and becomes smaller in cross-sectional area in a direction from the midsection to the second end. Thus, the mid-cross-sectional area is larger than each of the first and second end cross-sectional areas.

In a seventh embodiment of the present invention, a torque converter assembly is provided including an impeller, a turbine, and a stator. The impeller has a predetermined flow path for directing fluid radially outward through a substantially toroidal path. The turbine has a substantially toroidal flow path for directing fluid from the, impeller radially inward. The flow path in the torque converter turbine has an inlet and an outlet. The flow path decreases in flow area from the inlet to a predetermined point having a third area along the flow path and increases in flow area from the predetermined point to the outlet. The stator includes a plurality of stator blades. Each stator blade has a mean camber line length and a maximum thickness, which is less than approximately 20% of the mean camber line length.

In an eighth embodiment of the present invention, a torque converter assembly including an impeller, a turbine, and a stator is provided. The turbine has a predetermined flow path for directing fluid radially inward through a substantially toroidal path. The impeller has a substantially toroidal flow path for directing fluid radially outward. The flow path in the torque converter impeller has an inlet and an outlet. The flow path decreases in flow area from the inlet to a predetermined point having a third area along the flow path and increases in flow area from the predetermined point to the outlet. The stator includes a plurality of stator blades. Each stator blade has a mean camber line length and a maximum thickness, which is less than approximately 20% of the mean camber line length.

In a ninth embodiment of the present invention, a torque converter assembly is provided including an impeller, a turbine, and a stator. The impeller has a predetermined flow path for directing fluid radially outward through a substantially toroidal path. The turbine has a substantially toroidal flow path for directing fluid from the impeller radially inward. The flow path in the torque converter turbine has an inlet and an outlet. The flow path decreases in flow area from the inlet to a predetermined point having a third area along the flow path and increases in flow area from the predetermined point to the outlet. Each stator blade has a first end defined by a first end cross-sectional area, a second end defined by a second end cross-sectional area, and a midsection defined by a mid-cross-sectional area. Each stator blade becomes smaller in cross-sectional area in a direction from the midsection to the first end and becomes smaller in cross-sectional area in a direction from the midsection to the second end. Thus, the mid-cross-sectional area is larger than each of the first and second cross-sectional areas.

In a tenth embodiment of the present invention, a torque converter assembly including an impeller, a turbine, and a stator is provided. The turbine has a predetermined flow path for directing fluid radially inward through a substantially toroidal path. The impeller has a substantially toroidal flow path for directing fluid radially outward. The flow path in the torque converter impeller has an inlet and an outlet. The flow path decreases in flow area from the inlet to a predetermined point having a third area along the flow path and increases in flow area from the predetermined point to the outlet. Each stator blade has a first end defined by a first end cross-sectional area, a second end defined by a second end cross-sectional area, and a midsection defined by a mid-cross-sectional area. Each stator blade becomes smaller in cross-sectional area in a direction from the midsection to the first end and becomes smaller in cross-sectional area in a direction from the midsection to the second end. Thus, the mid-cross-sectional area is larger than each of the first and second end cross-sectional areas.

The above features and advantages, and other features and advantages, of the present invention are readily apparent from the following detailed description of the best modes for carrying out the invention when taken in connection with the accompanying drawings.

DESCRIPTION OF THE PREFERRED EMBODIMENTS

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

Figure 1:
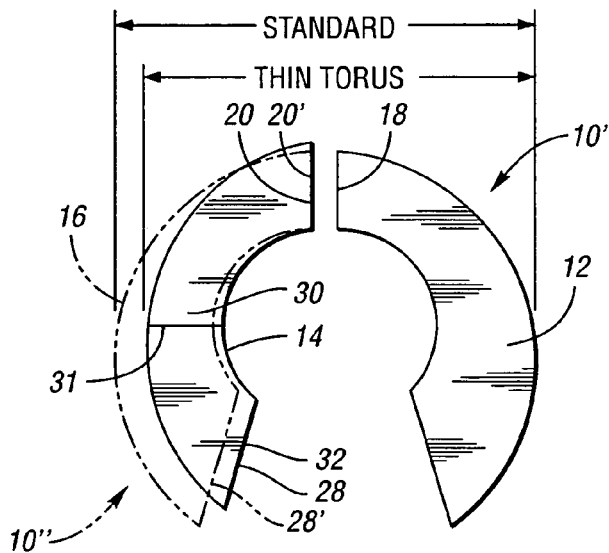
FIG. 1 is a cross-sectional comparison of a torque converter assembly with a controlled area thin torus turbine in accordance with the present invention and a torque converter with a standard torus turbine.

Referring to the drawings, there is seen in FIG. 1 a diagrammatic representation of a torque converter assembly 10' including a conventional impeller (or pump) 12 and a controlled area thin torus turbine 14. Also shown in FIG. 1 in dashed lines is a torque converter turbine 16, which has a conventional or standard torus. The stator 15, 15' of the torque converter, shown in FIG. 13, has been eliminated from FIG. 1 for clarity. The controlled area thin torus turbine 14 reduces the overall width of the torque converter 10' thereby reducing the overall length requirement for a transmission in which the controlled area thin torus turbine 14 is employed.

As seen in FIG. 1, the turbine 14, 16 has a plurality of spaced blades to which flow from the impeller 12 is delivered. Thus, the torque converter impeller 12 has an outlet cross-sectional area 18 that is equivalent to the inlet cross-sectional area 20, 20' of the turbine 14, 16.

Figure 3:
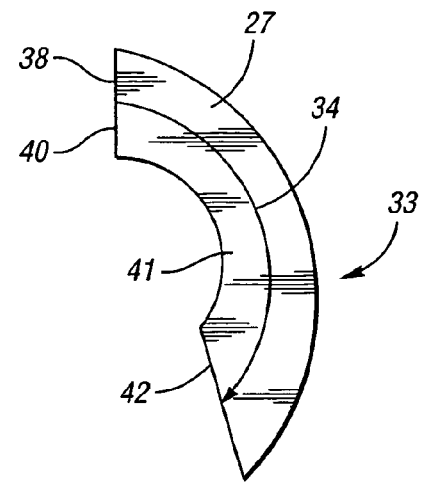
FIG. 3 is a schematic cross-sectional view of a flow path through a torque converter controlled area torus portion.
Figure 4:
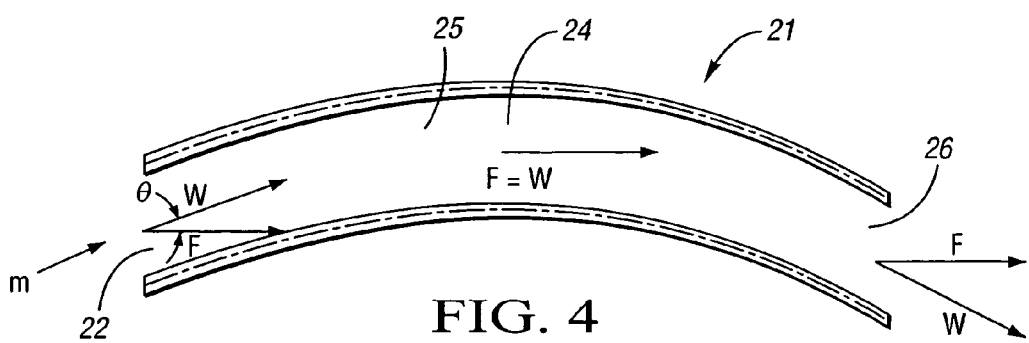
FIG. 4 is a schematic cross-sectional blade to blade view of one dimensional flow through a torque converter torus, illustrating toroidal velocity (F) versus relative velocity (W) through the torque converter torus path.

Referring to FIGS. 1 and 4 (when the torus portion 21 in FIG. 4 is a turbine 14, 16 portion), fluid flows through a predetermined passage or path 25 through the torus portion 21. The conventional or standard turbine 16 has a constant flow area from the turbine inlet cross-sectional area 20', which is equal to the area of the impeller outlet cross-sectional area 18, to the turbine outlet cross-sectional area 28' as defined in FIG. 1. The controlled area thin torus turbine 14 also has an inlet cross-sectional area 20 equal to the area of the impeller outlet cross-sectional area 18. The flow area of the controlled area thin torus turbine 14, which is a controlled area torus 33 as illustrated in FIG. 3, decreases at the middle portion 30, where it has a middle portion cross-sectional area 31, and thereafter increases toward an outlet 32 having an outlet cross-sectional area 28. In a preferred embodiment of the present invention, the ratio of the inlet cross-sectional area 20 to the middle portion cross-sectional area 31 to the outlet cross-sectional area 28 is approximately 1:0.8:1.

As seen in FIG. 4, the flow into the torus portion 21, which may be a turbine 14, 16 from FIG. 1, may be divided into a toroidal velocity F and a relative velocity W. These two velocities are related or proportional to each other through a function of the cosine of the blade angle θ. As the flow passes between the blades of the torus portion 21, the relative velocity W and toroidal velocity F coincide essentially at the approximate flow path midpoint 24 and are separated by the blade angle θ at the outlet 26.

Figure 2:
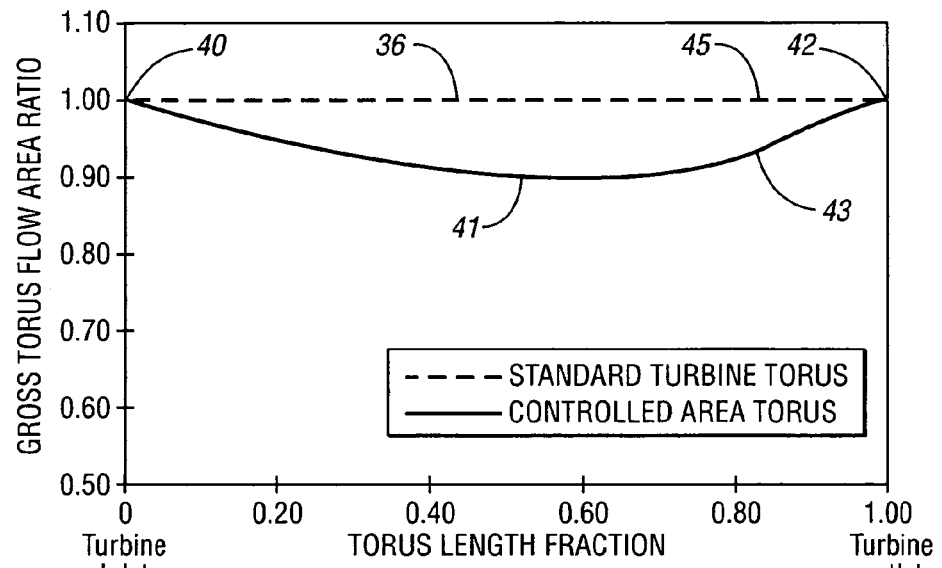
FIG. 2 is a graphical illustration showing the gross torus flow area ratio versus torus length fraction for a standard torus turbine and a controlled area thin torus turbine.

FIG. 2 graphically illustrates the gross torus flow area ratio over the torus length fraction for a torque converter 10" with a conventional turbine 16 and a torque converter 10' with a controlled area thin torus turbine 14, as defined in FIG. 1. The gross torus flow area ratio is representative of the area at a specific design point along the torus flow length 34 divided by the torus inlet cross-sectional area 38, as defined in FIG. 3. For example, a torus length fraction of 0.2 represents a point along the torus length 34, at a distance equal to twenty percent of the torus length 34, inward from the torus inlet 40.

As shown at 43 in FIG. 2, the controlled area thin torus turbine 14 of FIG. 1 has a ratio of inlet cross-sectional area 20 to middle portion cross-sectional area 31 to outlet cross-sectional area 28 of approximately 1:0.9:1. It can be seen at 45 in FIG. 2 that the gross torus flow area ratio versus torus length fraction for a conventional torque converter 10" is constant; that is, the gross torus flow area ratio is one for the entire conventional torus flow length.

As seen in FIG. 2, the gross torus flow area ratio for a controlled area torus 33 decreases from the torus inlet 40 to the approximate center of the torus length fraction, or middle portion, 41 and then increases to the torus outlet 42, as defined in FIG. 3. This change in gross flow area ratio reduces or eliminates the energy losses which otherwise might occur within the turbine flow path. In a conventional torque converter 10", an area of fluid separation tends to form near the midpoint 41 of the torus passage due to decelerating flow.

FIG. 4, as previously stated, schematically defines the toroidal velocity F versus relative velocity W through the torus flow path 25. If small leakages along the path 25 are ignored, the mass flow rate ṁ through the passage and the toroidal velocity F are constant. The relative velocity W in a direction tangent to the blade is proportional, as previously stated, to the toroidal velocity F as represented by the cosine of the angle θ. At the approximate flow path midpoint 24, the two velocities F, W are equal. This indicates that the relative velocity W decreases relative to the toroidal velocity F toward the approximate flow path midpoint 24 and then increases relative to the toroidal velocity F as the fluid passes to the torus outlet 26. Also, the relative velocity W is flowing into a region of increasing pressure as the fluid flows from the inlet 22 to the approximate flow path midpoint 24.

Under these conditions, flow separation and flow reversal can occur at the approximate midpoint 24 of the torus flow path 25. The present invention establishes a flow path 25 in which the relative velocity W is more uniform in relation to the toroidal velocity F because of the reduction in the flow area toward the midpoint of the flow path 24. By reducing the torus flow area near the flow path midpoint 24, the deceleration of the flow is reduced or diminished. Limiting the flow deceleration reduces the fluid separation in the passage 25 and thereby controls associated energy losses.

The thin torus turbine 14 of the present invention is similar to a thin torus turbine described in U.S. Ser. No. 10/765,690, entitled "Torque Converter with a Thin Torus Turbine," filed Jan. 26, 2004, which is assigned to General Motors Corporation and is hereby incorporated by reference in its entirety.

Figure 13:
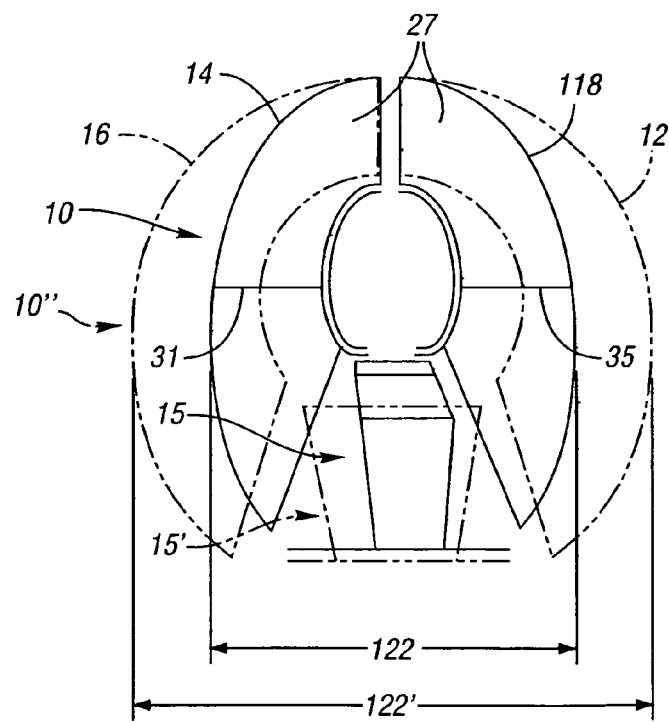
FIG. 13 is a cross-sectional comparison of a torque converter assembly with a controlled area thin torus turbine, a controlled area thin torus impeller, and a stator with blades defined by 3 sections in accordance with the present invention and a torque converter assembly with a standard or conventional torus turbine, a standard or conventional torus impeller, and standard or conventional stator.

The present invention also contemplates that the torque converter impeller 12 may have a controlled area thin torus structure as described hereinabove with respect to the torque converter turbine 14. Thus, the torus portions illustrated in FIGS. 3 and 4 may be representative of impeller torus portions. In this embodiment, both the impeller 12 and the turbine 14 may have the above-described structure. Referring to FIGS. 3 and 13, in this structure, both the turbine 14 and the impeller 118 have a torus structure where the inlet, which is 40 for the turbine and 42 for the impeller, and the outlet, which is 42 for the turbine and 40 for the impeller, of the passage 27 are larger in cross-sectional area than the middle portion cross-sectional area 31, 35.

The above-described structure, including FIGS. 1 through 4, is the preferred embodiment for one aspect of the present invention, however the gross torus flow area ratio may be varied within the scope of the present invention.

Figure 5:
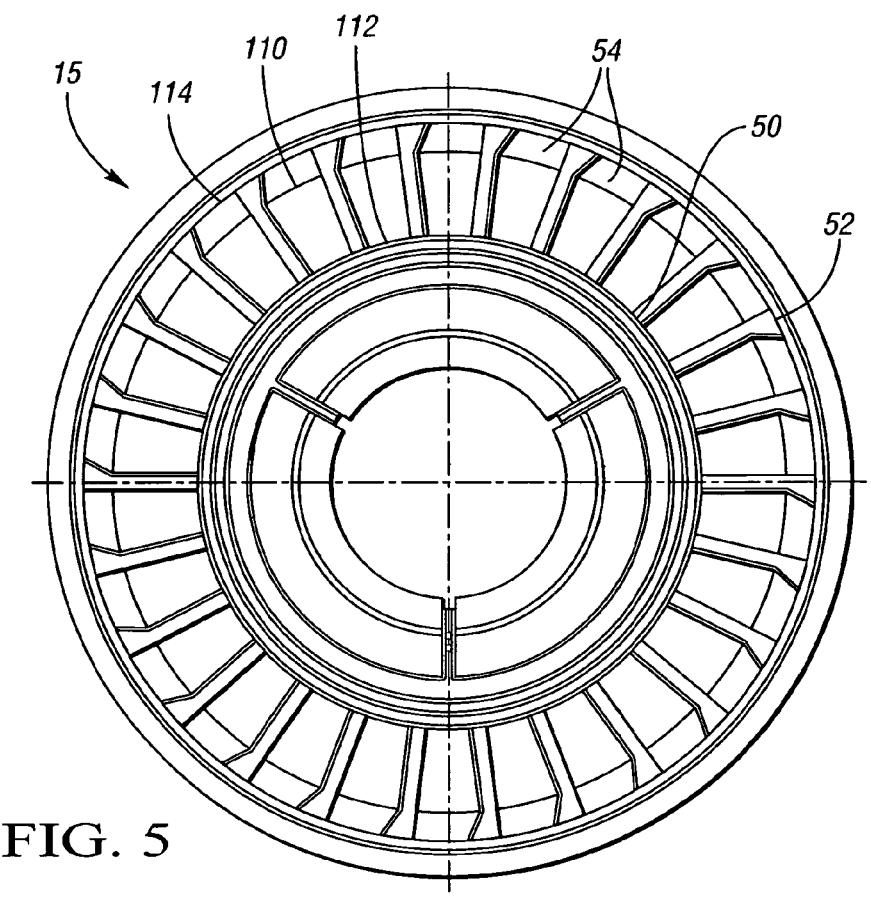
FIG. 5 is a top plan view of a stator for use with the torque converter assembly of FIG. 1 with a controlled area thin torus turbine or with the torque converter assembly of FIG. 13 with a controlled area thin torus turbine and pump.
Figure 6:
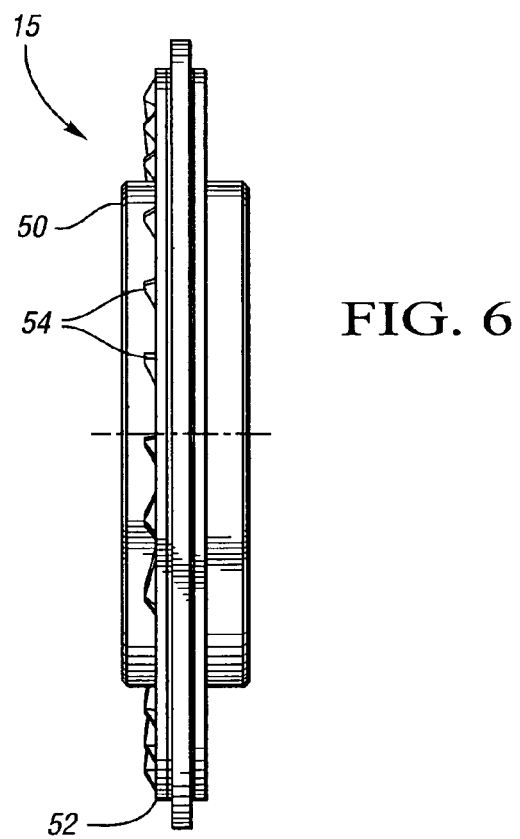
FIG. 6 is a side view of the stator of FIG. 5.
Figure 7:
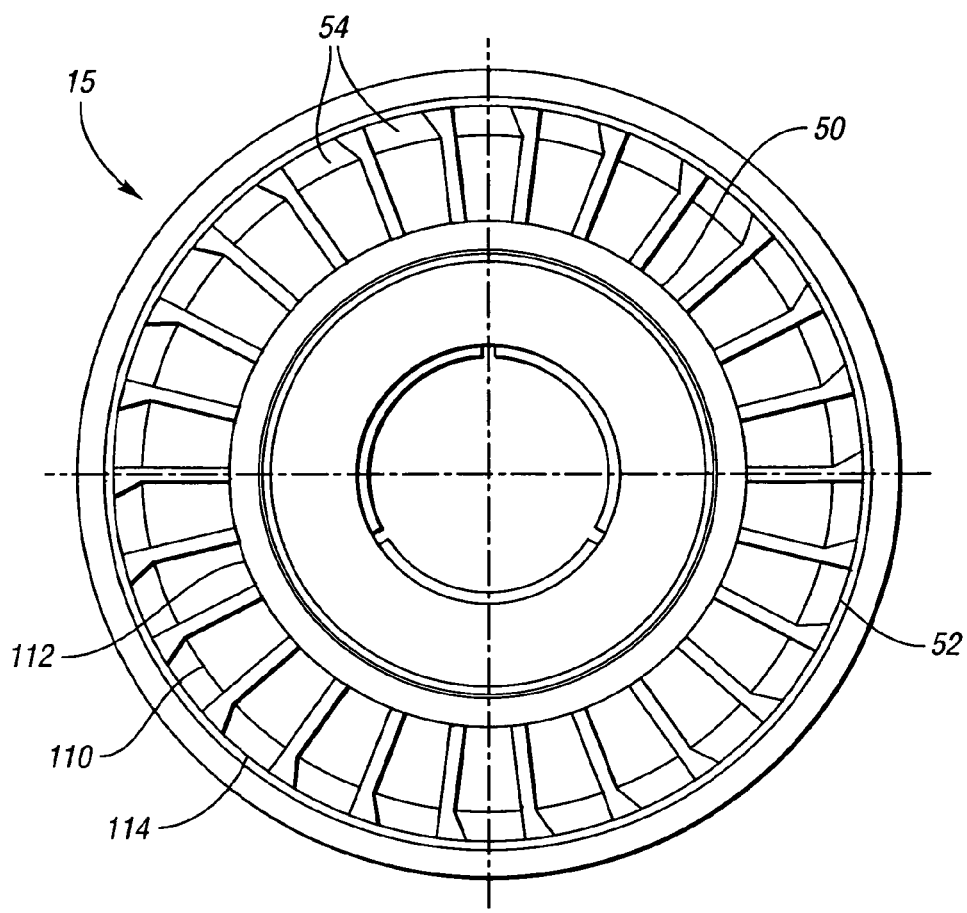
FIG. 7 is a bottom plan view of the stator of FIG. 5.

Referring now to FIGS. 5 through 7, a stator 15 for use with the torque converter of FIG. 1 is comprised of a shell 50, a core 52, and a plurality of blades 54. FIG. 1 illustrates the turbine 16 and impeller 12 (stator not shown) arranged in a conventional torque converter configuration, such as that shown in U.S. Pat. Nos. 4,177,885 and 5,431,536, both of which are assigned to General Motors Corporation and are hereby incorporated by reference in their entirety. A conventional torque converter stator is shown as 15' in FIG. 13. FIGS. 5 and 7 illustrate the stator 15 of the present invention from the top and bottom, respectively. FIG. 6 shows a side profile of the stator 15.

Figure 8:
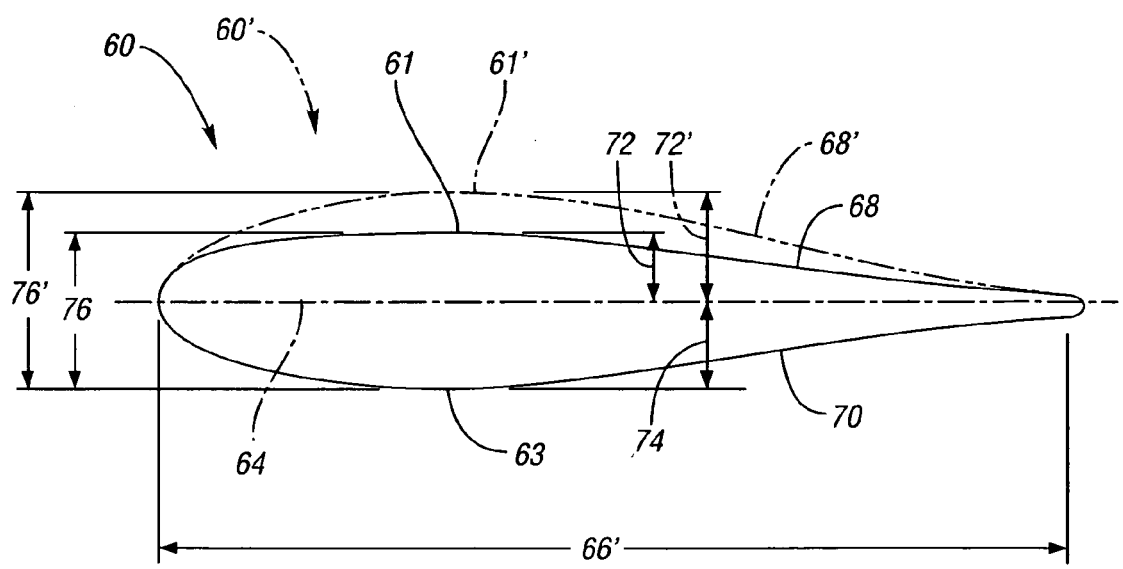
FIG. 8 is a schematic cross-sectional view of a stator blade airfoil.
Figure 9:
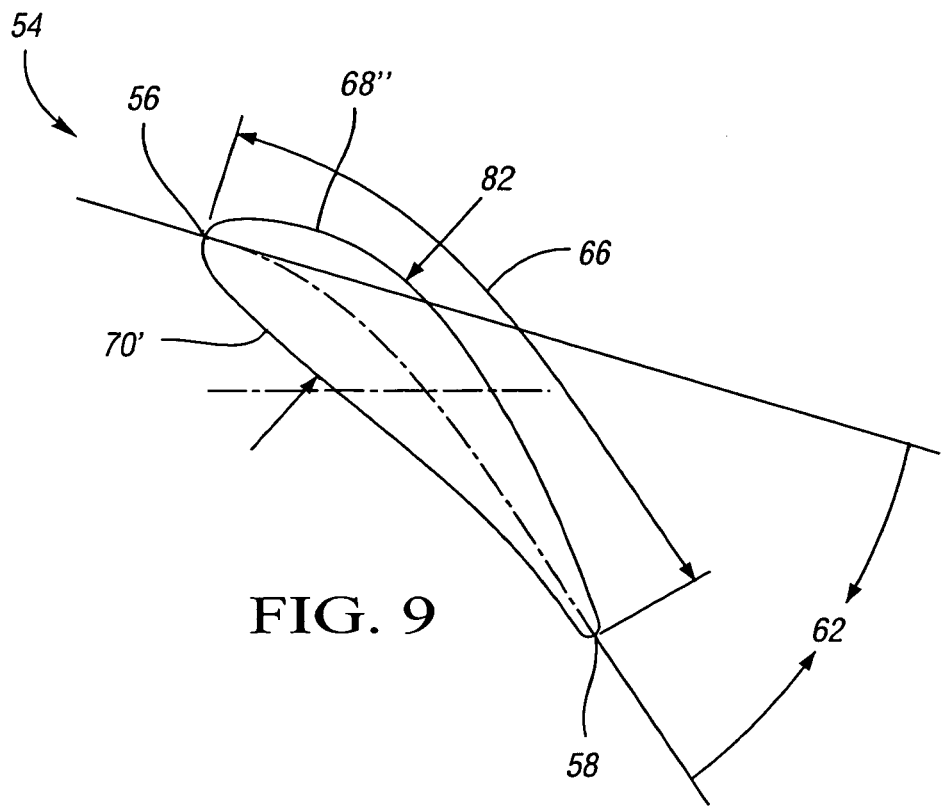
FIG. 9 is a schematic cross-sectional view of a stator blade in accordance with the present invention.

FIG. 8 shows a cross-sectional schematic view of a straight stator blade airfoil 60 and cross-sectional schematic view of an alternate stator blade airfoil 60'. An airfoil is the basic cross-sectional shape of a stator blade 54, as shown in FIG. 9, before forming the angle 62 between the inlet 56 and outlet 58. Referring back to FIG. 8, the length of the stator blade airfoil 60, 60' is referred to as the mean camber line length 66'. The stator blade airfoil 60, 60' of the present invention may or may not be symmetrical about the mean camber line 64. Thus, it is important to note that in the present invention the mean camber line 64 may not lie exactly equidistant from the uppermost 61, 61' and lowermost 63 points of the airfoil 60, 60', and is therefore an approximation of a true mean camber line. The uppermost 61, 61' and lowermost 63 points of the airfoil lie on the suction surface 68, 68' and pressure surface 70, respectively. The maximum distance 72, 72' from the mean camber line 64 to the suction surface 68, 68' and the maximum distance 74 from the mean camber line 64 to the pressure surface 70, in summation, form the maximum thickness 76, 76' of the airfoil.

As shown in FIG. 8, in one embodiment of the present invention, the maximum distance 72 from the mean camber line 64 to the suction surface 68 is 7.5% of the mean camber line length 66' and the maximum distance 74 from the mean camber line to the pressure surface 70 is 10% of the mean camber line length 66', whereby the maximum thickness 76 of the airfoil is 17.5% of the mean camber line length 66'.

FIG. 9 is a schematic cross-sectional view of a stator blade 54, which is the airfoil 60' of FIG. 8 that has been modified by the incorporation of an angle 62 between the inlet 56 and the outlet 58. The stator blade inlet 56 is located near the foremost point of the stator blade 54 and the outlet 58 is located near the rearmost point. The maximum thickness 82 of a stator blade 54 is measured with respect to the mean camber line length 66. In one embodiment of the present invention, shown in FIG. 9, the maximum thickness 82 of the stator blade 54 is approximately 15–18% of the mean camber line length 66. A stator blade 54 has two distinct surfaces. The suction surface 68" of the stator blade is the convex surface of the blade where pressures are lower. The pressure surface 70' is the concave surface of the blade where pressures are higher. The angle 62, which is the difference between the inlet 56 and the outlet 58, of each said stator blade 54 in the present invention is relatively small in comparison to the angle used in a conventional stator blade. In one embodiment of the present invention the angle 62 is between approximately 37° and 43°. In the embodiment of the present invention depicted in FIG. 9, the angle 62 is approximately 40°.

Figure 10:
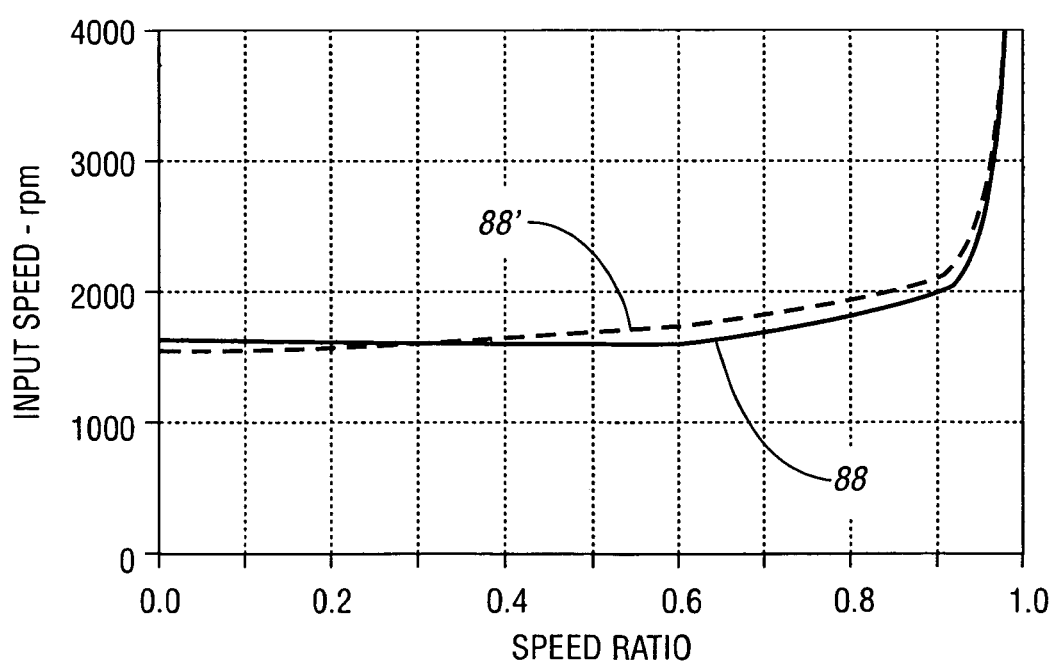
FIG. 10 is a graphical illustration showing input speeds corresponding with the stator blade of FIG. 9 compared with a standard or conventional stator blade over speed ratios ranging from 0.0 to 1.0.

Automotive torque converters normally produce a climbing input speed characteristic relative to speed ratio (the ratio of output speed to input speed). However, a constant input speed extending across a range of speed ratios is beneficial in improving fuel economy. As illustrated in FIG. 10, the present stator blade 54 of FIG. 9 maintains a nearly constant input speed from 0.0 to 0.70 speed ratio, as shown at 88. The conventional stator blade, as shown at 88', produces a noticeably increasing input speed characteristic. Thus, FIG. 10 illustrates the improved input speed constancy resulting from a stator with the present stator blade design 54 of FIG. 9, as shown at 88, over a conventional stator blade, as shown at 88'.

Figure 11:
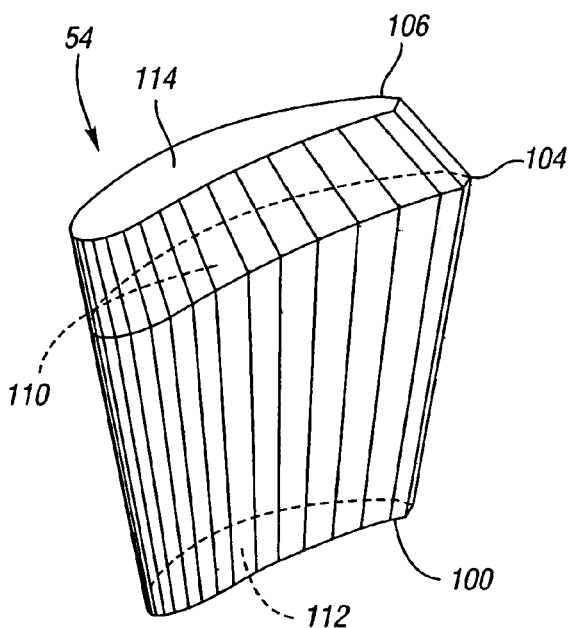
FIG. 11 is a schematic perspective surface illustration of a stator blade in accordance with the present invention.
Figure 12:
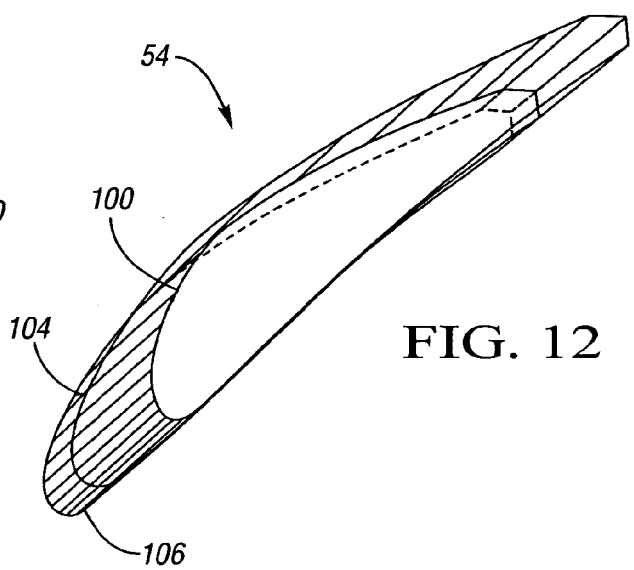
FIG. 12 is a perspective end view of the stator blade of FIG. 11.

Referring to FIGS. 5–6 and 11, each stator blade 54 has a first end 100 affixed to the stator shell 50, a midsection 104, and a second end 106 affixed to the stator core 52. The cross-sectional area of the midsection, the mid-cross-sectional area 110, is larger than the either the first end cross-sectional area 112 or the second end cross-sectional area 114. In one embodiment of the present invention, shown in the perspective surface drawing of FIG. 11, each stator blade 54 is linearly tapered between the mid-cross-sectional area 110 and both the first end cross-sectional area 112 and the second end cross-sectional area 114. FIG. 12 illustrates an approximate end view of the stator blade 54 illustrated in FIG. 11 from the perspective of the shell 50 looking out radially toward the core 52. FIGS. 5 through 7 illustrate a stator 15, which has a plurality of the stator blades 54 described above united with a stator shell 50 and core 52. These illustrations also depict the characteristically large stator blade mid-cross-sectional area 110 and the smaller first end cross-sectional area 112 and second end cross-sectional area 114 of the present invention.

FIG. 13 illustrates a scaled comparison of a torque converter with a controlled area thin torus turbine 14 and a controlled area thin torus impeller 118 as opposed to a torque converter with a conventional torus turbine 16 and a conventional torus impeller 12. The torque converter 10 with the controlled area thin torus turbine 14 and controlled area thin torus impeller 118 illustrated has been scaled to the approximate diameter of a conventional torque converter 10" to provide for an accurate comparison of torque converter width 122, 122'. FIG. 13 clearly illustrates the reduction in torque converter width 122 attained by a torque converter 10 having a controlled area thin torus turbine 14 and controlled area thin torus impeller 118. A reduced torque converter width 122 reduces the overall packaging length requirement for a transmission in which the torque converter 10 is employed.

The present invention contemplates a torque converter 10 with a controlled area thin torus turbine 14, controlled area thin torus impeller 118, stator blades 54 having a reduced thickness, and a stator blade 54 design as shown in FIG. 11. A comparison of performance data collected from the torque converter 10 as contemplated by this invention with a prior art thin torus torque converter (not shown) is graphically illustrated in FIG. 14. The torque converter performance parameters displayed are $$\frac{K\_Factor}{100},$$

torque ratio, speed ratio, and efficiency where:

$$KFactor = \frac{N_p}{\sqrt{T_p}}$$

$$TorqueRatio = \frac{T_t}{T_p}$$

$$SpeedRatio = \frac{N_t}{N_p}$$

Efficiency=Torque Ratio×Speed Ratio and where:

$N_p$=pump rotational speed (rpm)

$N_t$=turbine rotational speed (rpm)

$T_p$=pump torque (Nm)

$T_t$=turbine torque (Nm)

Stall=operating condition when speed ratio is 0.0

Figure 14:
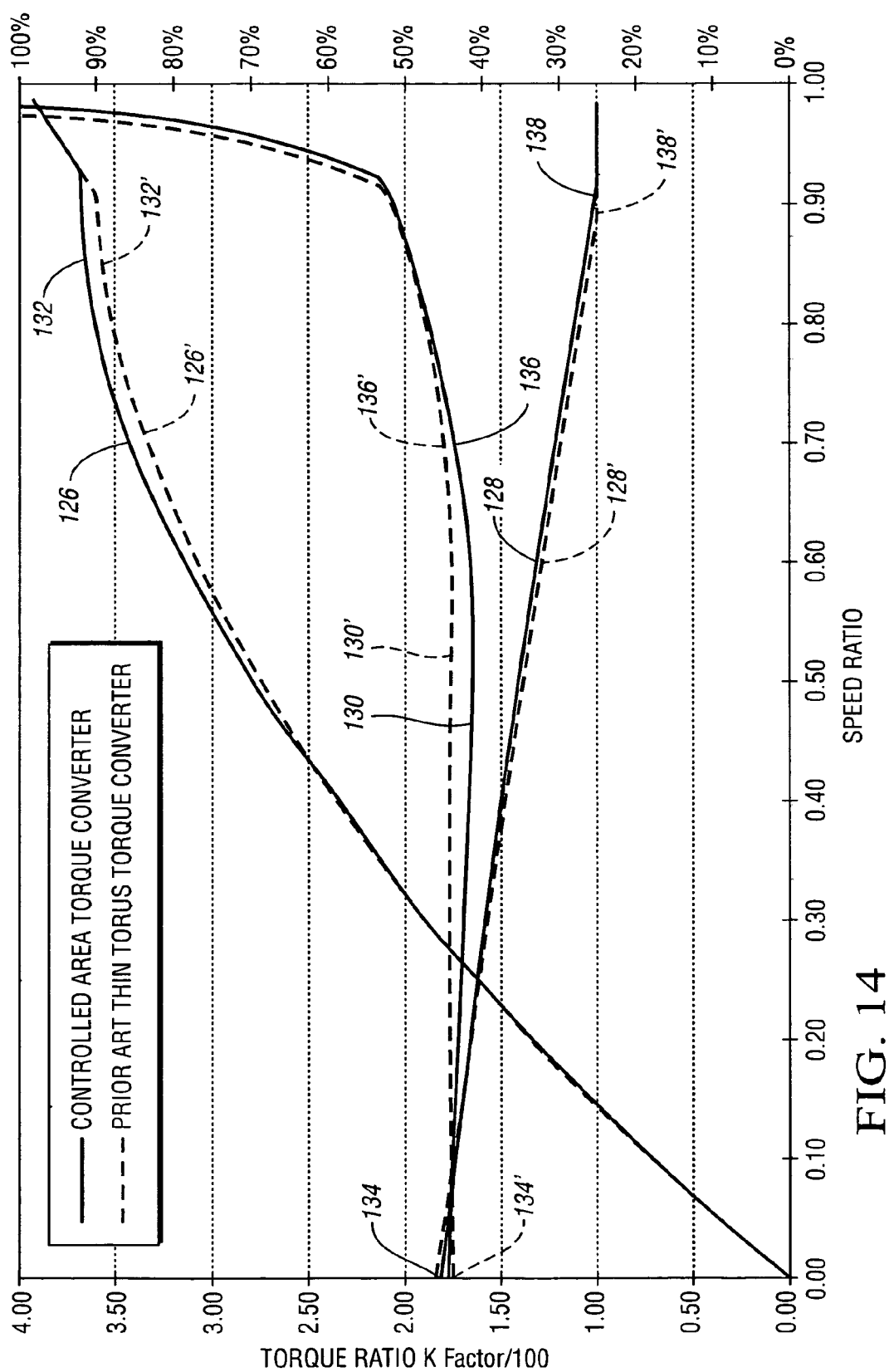
FIG. 14 is a graphical illustration comparing torque converter performance data for the torque converter assembly of the present invention and a prior art thin torus torque converter assembly.

In FIG. 14, the solid lines are representative of a torque converter 10 having a stator 15 as shown in FIGS. 5–7, a plurality of stator blades 54 as shown in FIGS. 9 and 11, a controlled area thin torus turbine 14, and a controlled area thin torus impeller 118 as shown in FIG. 13. The dashed lines represent a prior art thin torus torque converter (not shown).

Referring to FIG. 14, the positive results attained by the present torque converter 10 are displayed by an increase in efficiency 126, 126' and a lower K Factor 136, 136' at high speed ratio while maintaining torque ratio 128, 128' and efficiency 126, 126', and torque multiplication greater than 1 to a higher speed ratio 138, 138'. The values of K Factor 130, 130' displayed in FIG. 14 are values of $$\frac{K\_Factor}{100}$$

to allow for condensed plotting on the same axes as the torque ratio 128, 128'. In FIG. 14 it is clear that the efficiency 126 for the torque converter 10 having a stator 15 as shown in FIGS. 5–7, a plurality of stator blades 54 as shown in FIGS. 9 and 11, a controlled area thin torus turbine 14, and a controlled area thin torus impeller 118 as shown in FIG. 13 is higher, particularly at speed ratios of approximately 0.85, shown at 132, 132', than the efficiency 126' of the prior art thin torus torque converter (not shown). Higher efficiency 126, 126' is related,to higher fuel economy. K Factor 130, 130' is a measure of engine rotational speed and torque. Torque ratio 128, 128' measures output to input torque multiplication. Both K Factor 130, 130' and torque ratio 128, 128' are used to compare torque converter performance. It is preferred to have a K Factor 130, 130' that remains relatively low over a longer range of speed ratios. More specifically, a K Factor 130, 130' with a minimal increase in value from stall 134, 134' to a speed ratio of approximately 0.7, shown at 136, 136', is favored over a K Factor 130, 130' that has a larger increase over the same interval. It is apparent in FIG. 14 that the K Factor for the prior art thin torus torque converter 130' is slightly higher at a speed ratio of 0.7, shown at 136', than at stall 134', whereas the K Factor 136 for the torque converter 10 having a stator 15 as shown in FIGS. 5–7, a plurality of stator blades 54 as shown in FIGS. 9 and 11, a controlled area thin torus turbine 14, and a controlled area thin torus impeller 118 as shown in FIG. 13 is nearly identical to its K Factor 130 at stall 134.

It is preferred for a torque converter 10, 10', 10" to reach a torque ratio of one at a higher speed ratio than at a lower speed ratio. As shown in FIG. 14, the torque converter 10 having a stator 15 as shown in FIGS. 5–7, a plurality of stator blades 54 as shown in FIGS. 9 and 11, a controlled area thin torus turbine 14, and a controlled area thin torus impeller 118 as shown in FIG. 13 reaches a torque ratio of one, shown at 138, at a slightly higher speed ratio than the prior art thin torus torque converter (not shown), at 138'.

The invention contemplated is any combination of the three torque converter structures described above. It may be a torque converter 10 wherein the impeller 118 and turbine 14 have passages 27, as defined in FIG. 3, that are smaller in cross-sectional area in the middle than at either end of the passage 27, as shown in FIG. 13, and where the maximum thickness of each stator blade 82, as shown in FIG. 9, is less than approximately 20% of the mean camber line length 66. The invention herein may be a torque converter 10 wherein the impeller 118 and the turbine 14 have passages 27, as defined in FIG. 3, that are smaller in cross-sectional area in the middle than at either end of the passage 27, as shown in FIG. 13, and each stator blade mid-cross-sectional area 110 is larger than both the first end cross-sectional area 112 and the second end cross-sectional area 114 as shown in FIGS. 5, 7, and 11. The invention may also be a torque converter 10, 10', 10" wherein the maximum thickness of each stator blade 82 is less than approximately 20% of the mean camber line length 66, as shown in FIG. 9, and each stator blade mid-cross-sectional area 110 is larger than both the first end cross-sectional area 112 and the second end cross-sectional area 114, as shown in FIGS. 5, 7, and 11. Accordingly, the various features described may be implemented in different combinations within the scope of the present invention.

While the best modes for carrying out the invention have been described in detail, those familiar with the art to which this invention relates will recognize various alternative designs and embodiments for practicing the invention within the scope of the appended claims.

The invention claimed is:

1. A torque converter assembly including an impeller, a turbine, and a stator, comprising:
   at least one of the impeller and the turbine having a passage for directing fluid wherein each said passage has an inlet having an inlet cross-sectional area, an outlet having an outlet cross-sectional area, and a middle portion having a middle portion cross-sectional area, wherein said middle portion cross-sectional area is smaller than each of said inlet cross-sectional area and said outlet cross-sectional area;

the stator including a core, a shell, and a plurality of stator blades; and each said stator blade having a midsection defined by a mid-cross-sectional area, a first end defined by a first end cross-sectional area attached to said core, and a second end defined by a second end cross-sectional area attached to said shell, wherein said mid-cross-sectional area is larger than each of said first end cross-sectional area and said second end cross-sectional area.

2. The torque converter defined in claim 1 wherein a ratio of said inlet cross-sectional area, said middle portion cross-sectional area, and said outlet cross-sectional area is approximately 1:0.8:1.

3. The torque converter defined in claim 1 wherein an angle difference between an inlet and an outlet of each said stator blade is between approximately 37° and 43°.

4. The torque converter defined in claim 1 wherein each said stator blade has a mean camber line, a mean camber line length and a maximum thickness which is less than 20% of said mean camber line length.

5. The torque converter defined in claim 4 wherein each said stator blade is nonsymmetrical with respect to said mean camber line.

6. The torque converter defined in claim 1 wherein each said stator blade becomes smaller in cross-sectional area in a direction from said mid-cross-sectional area to said first end cross-sectional area.

7. The torque converter defined in claim 6 wherein each said stator blade is linearly tapered between said mid-cross-sectional area and said first end cross-sectional area.

8. The torque converter defined in claim 1 wherein each said stator blade becomes smaller in cross-sectional area in a direction from said mid-cross-sectional area to said second end cross-sectional area.

9. The torque converter defined in claim 8 wherein each said stator blade is linearly tapered between said mid-cross-sectional area and said second end cross sectional area.

10. A torque converter assembly including an impeller, a turbine, and a stator, comprising:

at least one of the impeller and the turbine having a passage for directing fluid wherein each said passage has an inlet having an inlet cross-sectional area, an outlet having an outlet cross-sectional area, and a middle portion having a middle portion cross-sectional area, wherein said middle portion cross-sectional area is smaller than each of said inlet cross-sectional area and said outlet cross-sectional area; and the stator including a plurality of stator blades, each said stator blade having a mean camber line length and having a maximum thickness which is less than approximately 20% of said mean camber line length.

11. The torque converter defined in claim 10 wherein each said stator blade is nonsymmetrical with respect to said mean camber line.

12. The torque converter defined in claim 10 wherein each said stator blade may be characterized by an airfoil wherein a maximum thickness of said airfoil is between approximately 15% and 18% of said mean camber line length.

13. The torque converter defined in claim 10 wherein a suction surface of each said stator blade is located at a maximum distance from said mean camber line of 8% of said mean camber line length.

14. The torque converter defined in claim 10 wherein a pressure surface of each said stator blade is located at a maximum distance from said mean camber line of 10% of said mean camber line length.

15. The torque converter defined in claim 10 wherein a ratio of said inlet cross-sectional area, said middle portion cross-sectional area, and said outlet cross-sectional area is approximately 1:0.8:1.

16. A torque converter assembly including an impeller, a turbine, and a stator, comprising:

the stator including a plurality of stator blades, each said stator blade having a mean camber line length and having a maximum thickness which is less than approximately 20% of said mean camber line length; and each said stator blade having a midsection defined by a mid-cross-sectional area, a first end defined by a first end cross-sectional area attached to said core, and a second end defined by a second end cross-sectional area attached to said shell, wherein said mid-cross-sectional area is larger than each of said first end cross-sectional area and said second end cross-sectional area.

17. The torque converter defined in claim 16 wherein each said stator blade is nonsymmetrical with respect to said mean camber line.

18. The torque converter defined in claim 16 wherein an angle difference between an inlet and an outlet of each said stator blade is between approximately 37° and 43°.

19. The torque converter defined in claim 16 wherein each said stator blade may be characterized by an airfoil wherein a maximum thickness of said airfoil is between approximately 15% and 18% of said mean camber line length.

20. The torque converter defined in claim 16 wherein a suction surface of each said stator blade is located at a maximum distance from said mean camber line of 8% of said mean camber line length.

21. The torque converter defined in claim 16 wherein a pressure surface of each said stator blade is located at a maximum distance from said mean camber line of 10% of said mean camber line length.

22. The torque converter defined in claim 16 wherein each said stator blade becomes smaller in cross-sectional area in a direction from said mid-cross-sectional area to said first end cross-sectional area.

23. The torque converter defined in claim 22 wherein each said stator blade is linearly tapered between said mid-cross-sectional area and said first end cross-sectional area.

24. The torque converter defined in claim 16 wherein each said stator blade becomes smaller in cross-sectional area in a direction from said mid-cross-sectional area to said second end cross-sectional area.

25. The torque converter defined in claim 24 wherein each said stator blade is linearly tapered between said mid-cross-sectional area and said second end cross sectional area.

* * * * *